(12) United States Patent
Endo et al.

(10) Patent No.: US 12,535,541 B2
(45) Date of Patent: Jan. 27, 2026

(54) MAGNETIC SENSOR

(71) Applicant: Resonac Corporation, Tokyo (JP)

(72) Inventors: Daizo Endo, Tokyo (JP); Hiroyuki Tomita, Tokyo (JP); Sho Tonegawa, Tokyo (JP)

(73) Assignee: Resonac Corporation, Tokyo (JP)

( * ) Notice: Subject to any disclaimer, the term of this patent is extended or adjusted under 35 U.S.C. 154(b) by 212 days.

(21) Appl. No.: 18/475,458

(22) Filed: Sep. 27, 2023

(65) Prior Publication Data

US 2024/0111002 A1    Apr. 4, 2024

(30) Foreign Application Priority Data

Sep. 28, 2022  (JP) .................................. 2022-155332

(51) Int. Cl.
  *G01R 33/06*  (2006.01)
  *G01R 33/00*  (2006.01)
(52) U.S. Cl.
  CPC ........ *G01R 33/063* (2013.01); *G01R 33/0011* (2013.01)

(58) Field of Classification Search
  CPC ...... G01R 33/063; G01R 33/06; G01R 33/00; G01R 33/0011; G01R 33/02; G01R 33/09; G01R 33/091; G01R 33/093; G01D 5/245; H01L 43/00; G01P 3/488
  See application file for complete search history.

(56) References Cited

U.S. PATENT DOCUMENTS

2021/0141035 A1* 5/2021 Endo .................. G01R 33/0052

FOREIGN PATENT DOCUMENTS

JP         2008-249406 A    10/2008

* cited by examiner

*Primary Examiner* — Son T Le
(74) *Attorney, Agent, or Firm* — Sughrue Mion, PLLC

(57) ABSTRACT

A magnetic sensor includes: at least one sensitive element including a soft magnetic material and having a longitudinal direction and a transverse direction and a uniaxial magnetic anisotropy in a direction intersecting the longitudinal direction, the at least one sensitive element being configured to sense a magnetic field by a magnetic impedance effect; at least one protruding portion including a soft magnetic material and protruding in the longitudinal direction from a longitudinal end of the at least one sensitive element; and a guiding member disposed opposite the at least one protruding portion and made of a soft magnetic material, the guiding member being configured to guide magnetic field lines toward the at least one protruding portion.

6 Claims, 8 Drawing Sheets

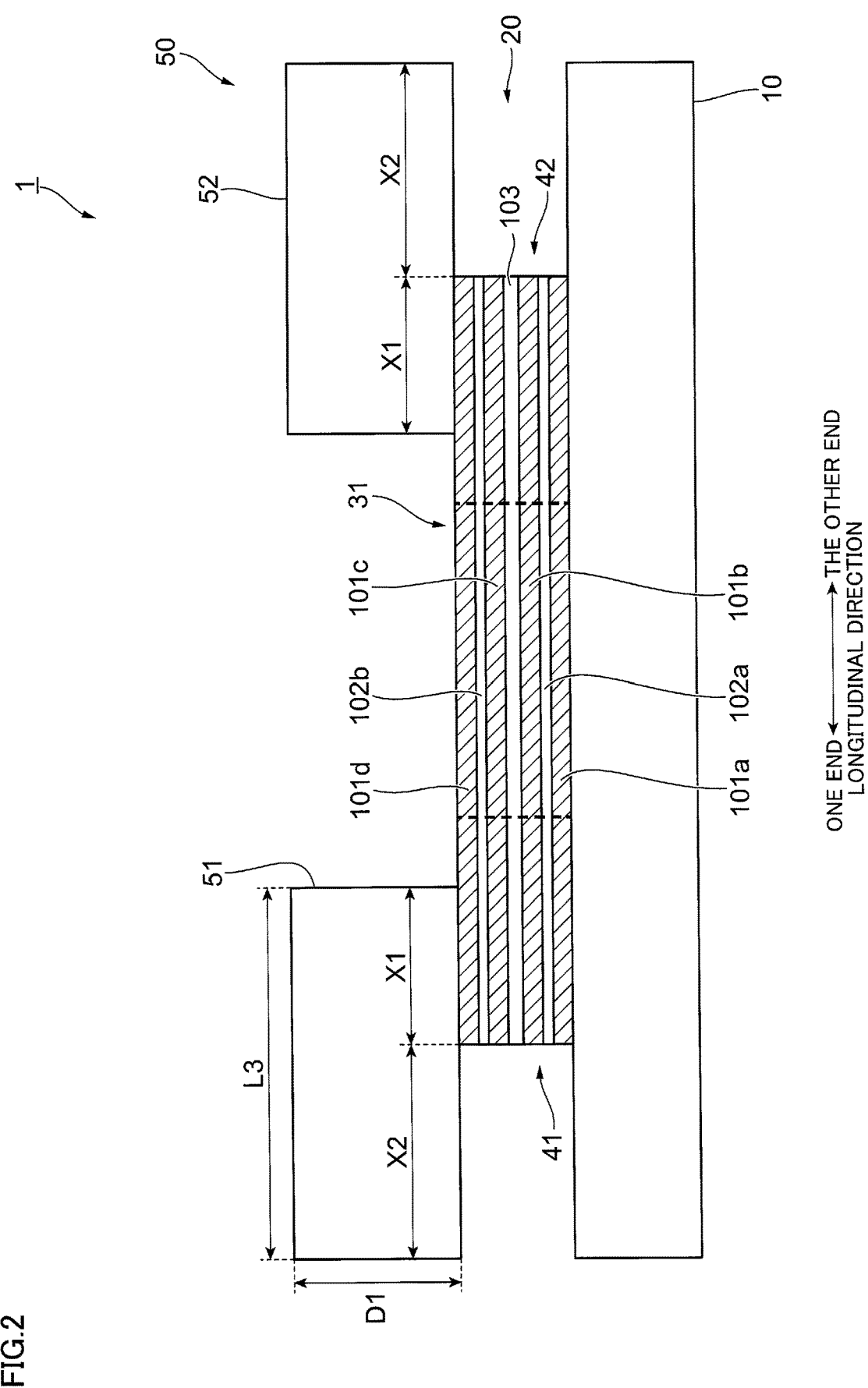

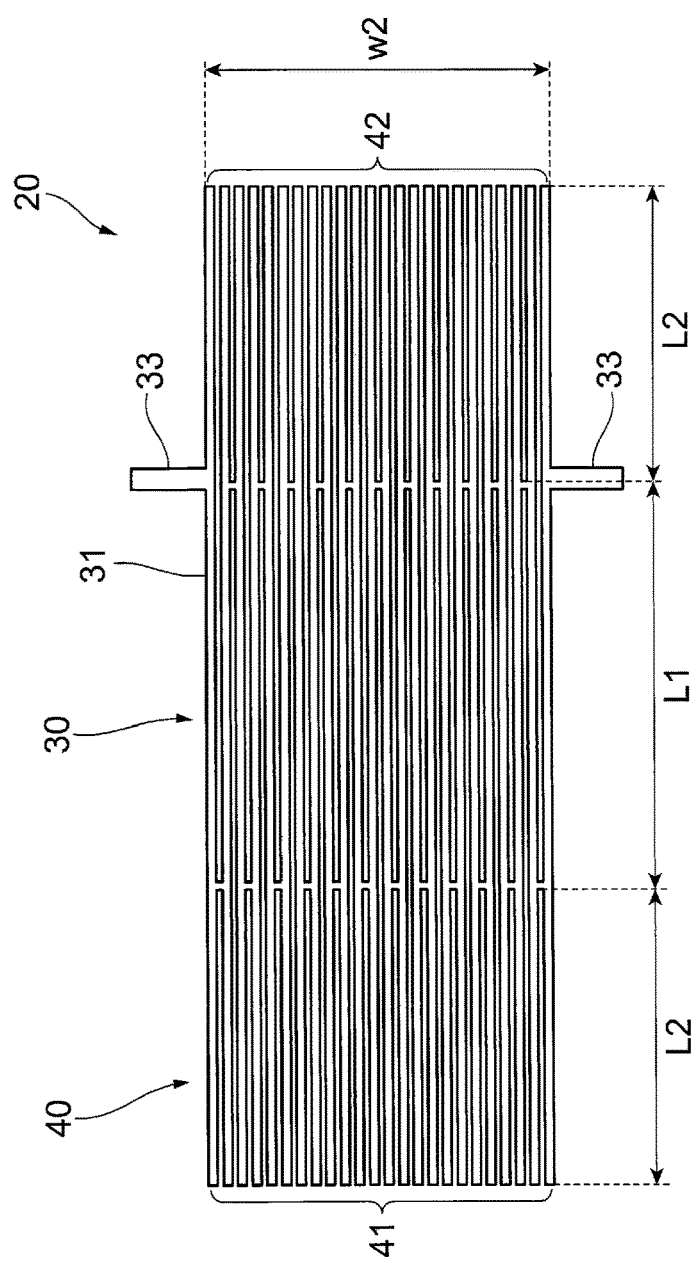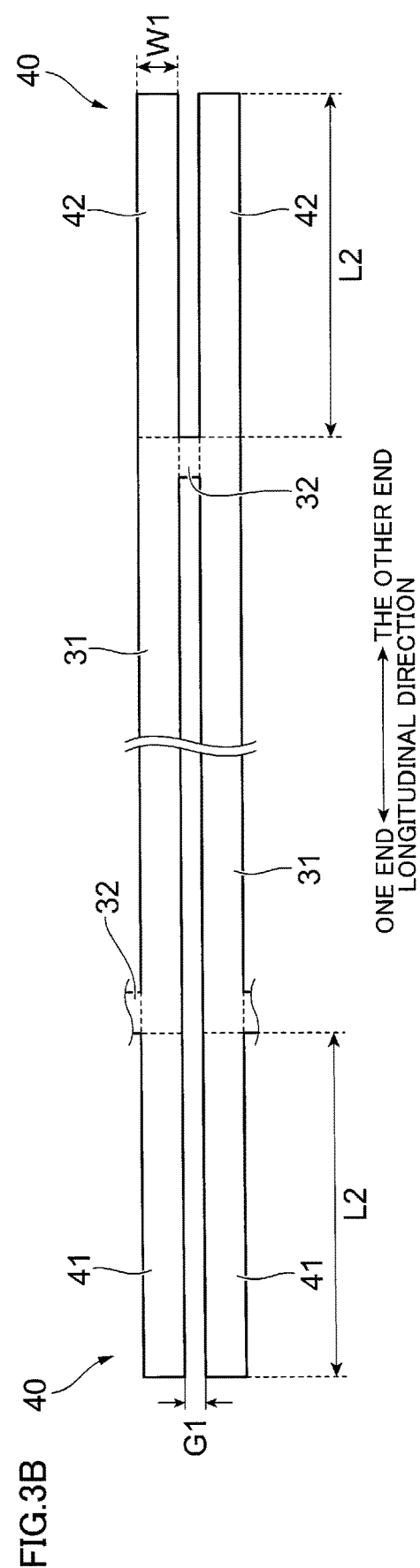
FIG.3A
FIG.3B

MAGNETIC SENSOR

CROSS REFERENCE TO RELATED APPLICATIONS

This application is based on and claims priority under 35 USC § 119 to Japanese Patent Application No. 2022-155332 filed on Sep. 28, 2022, the disclosure of which is incorporated herein by reference in its entirety.

BACKGROUND

Technical Field

The present invention relates to a magnetic sensor.

Related Art

Patent Document 1 discloses a magnetic impedance effect element including: a magneto-sensitive portion composed of a plurality of soft magnetic material films provided with a uniaxial anisotropy; and a yoke portion composed of a soft magnetic material film and configured to guide a magnetic flux into the magneto-sensitive portion.

CITATION LIST

Patent Literature

Patent Document 1: Japanese Patent Application Laid-Open Publication No. 2008-249406

SUMMARY

Magnetic sensors using a sensitive element that senses a magnetic field by a magnetic impedance effect are required to have high sensitivity to changes in the magnetic field.

It is an object of certain embodiments of the present invention to improve the sensitivity of magnetic sensors that utilize a magnetic impedance effect.

Certain embodiments of the present invention provide the following aspects (1) to (6).

In an aspect (1), there is provided a magnetic sensor comprising: at least one sensitive element (sensitive element 31) including a soft magnetic material and having a longitudinal direction and a transverse direction and a uniaxial magnetic anisotropy in a direction intersecting the longitudinal direction, the at least one sensitive element being configured to sense a magnetic field by a magnetic impedance effect; at least one protruding portion (protruding portion 40) including a soft magnetic material and protruding in the longitudinal direction from a longitudinal end of the at least one sensitive element; and a guiding member (first guiding member 51 and second guiding member 52) disposed opposite the at least one protruding portion and made of a soft magnetic material, the guiding member being configured to guide magnetic field lines toward the at least one protruding portion.

In an aspect (2) according to the aspect (1), the guiding member may be disposed to overlap the at least one protruding portion.

In an aspect (3) according to the aspect (2), a longitudinal length of a region of the guiding member that overlaps the at least one protruding portion may be from 10% to 100% of a longitudinal length of the at least one protruding portion.

In an aspect (4) according to the aspect (2) or (3), the guiding member may have a longitudinal end extending beyond the at least one protruding portion in the longitudinal direction.

In an aspect (5) according to any one of the aspects (1) to (4), the at least one sensitive element may comprise a plurality of sensitive elements arranged in the transverse direction, the at least one protruding portion may comprise a plurality of protruding portions protruding in the longitudinal direction from longitudinal ends of the respective sensitive elements, and the guiding member may be disposed opposite the plurality of protruding portions.

In an aspect (6) according to any one of the aspects (1) to (5), the guiding member may include a soft magnetic material with a higher magnetic permeability than a soft magnetic material included in the at least one sensitive element.

Certain embodiments of the present invention improve the sensitivity of magnetic sensors that utilize a magnetic impedance effect.

BRIEF DESCRIPTION OF THE DRAWINGS

An exemplary embodiment of the present invention will now be described in detail with reference to the drawings, in which:

FIG. 2 illustrates an example magnetic sensor according to an embodiment;

FIGS. 3A and 3B illustrate an example sensor portion according to an embodiment;

DETAILED DESCRIPTION

An exemplary embodiment of the present invention will now be described with reference to the drawings.

Configuration of Magnetic Sensor 1

Figure 1:
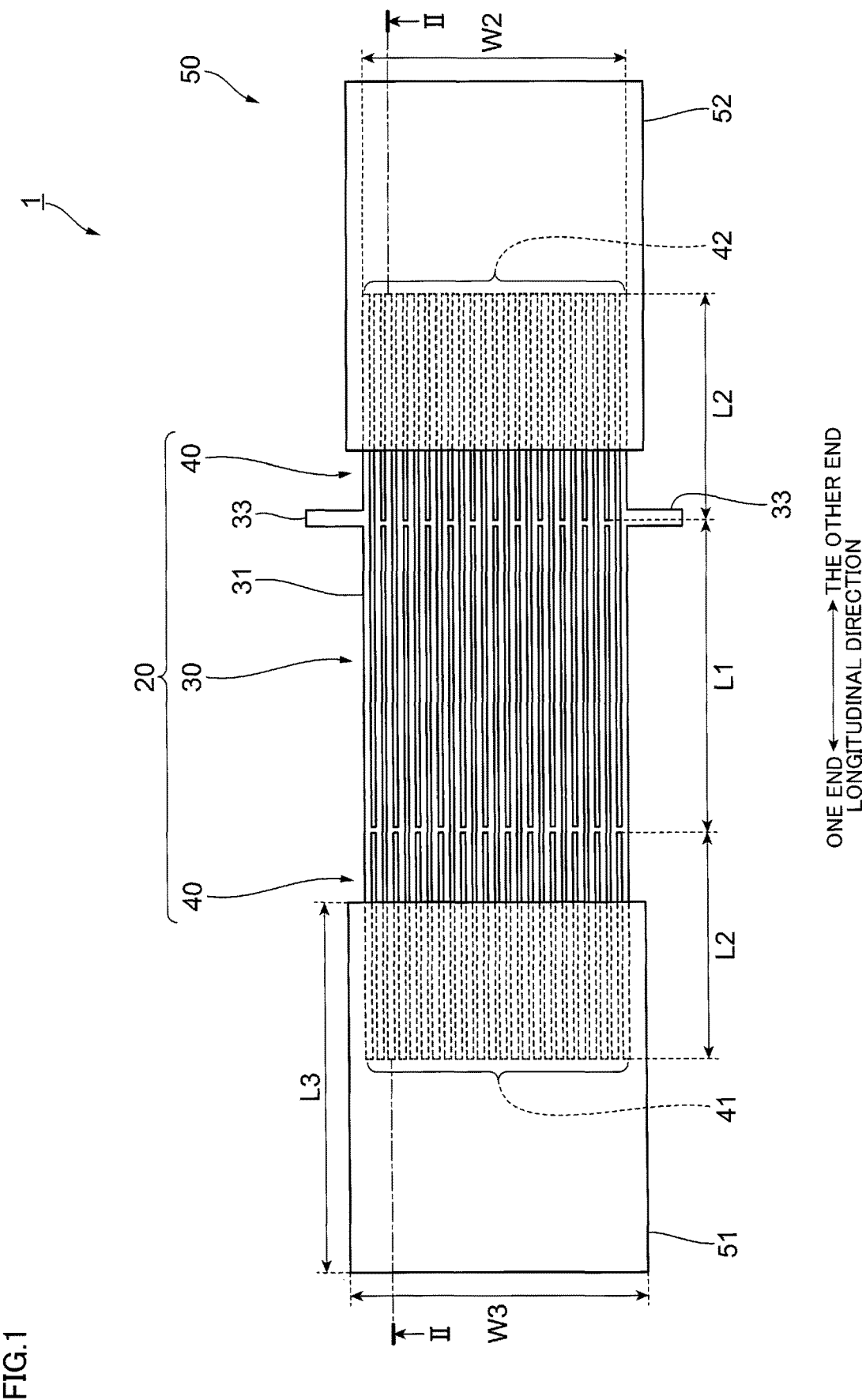
FIG. 1 illustrates an example magnetic sensor according to an embodiment.

FIGS. 1 and 2 illustrate an example magnetic sensor 1 according to the present embodiment, where FIG. 1 is a plan view of the magnetic sensor 1 and FIG. 2 is a cross-sectional view taken along the line II-II in FIG. 1.

As shown in FIGS. 1 and 2, the magnetic sensor 1 according to the present embodiment includes a non-magnetic substrate 10 and a sensor portion 20 disposed on the substrate 10. The sensor portion 20 includes a sensitive portion 30 for sensing a magnetic field and a protruding portion 40 protruding from the sensitive portion 30. The magnetic sensor 1 further includes a guiding portion 50 for guiding magnetic field lines, where the guiding portion 50 is disposed in confronting relationship to the protruding portion 40 of the sensor portion 20.

By way of example, the magnetic sensor 1 has a rectangular planar shape with a longitudinal direction and a transverse direction. The size of the planar shape of the magnetic sensor 1 measures several millimeters on a side. For example, the magnetic sensor 1 may be about 5 mm to 20 mm long in the longitudinal direction (horizontal direction in FIG. 1) and about 3 mm to 5 mm long in the transverse direction (vertical direction in FIG. 1). The size of the planar shape of the magnetic sensor 1 may be any other value. Also, the magnetic sensor 1 may have any other planar shape than rectangles.

The substrate 10 is made of a non-magnetic material. Specific examples of the substrate 10 include oxide substrates such as those made of glass and sapphire, semiconductor substrates such as those made of silicon, and metal substrates such as those made of aluminum, stainless steel, and metals plated with nickel phosphorus. When the substrate 10 is highly conductive, an insulator layer providing electrical insulation between the substrate 10 and the sensitive portion 30 may be disposed at the surface of the substrate 10 on which the sensitive portion 30 is to be disposed. Specific examples of insulators constituting the insulator layer include oxides such as $SiO_2$, $Al_2O_3$, and $TiO_2$, and nitrides such as $Si_3N_4$ and AlN. Here, the substrate 10 is described as being a glass substrate. The substrate 10 is 0.3 mm to 2 mm thick, for example. The thickness may be any other value.

Configuration of Sensor Portion 20

The sensor portion 20 in the magnetic sensor 1 will now be described.

FIGS. 3A and 3B illustrate the example sensor portion 20 according to the present embodiment, where FIG. 3A is a plan view of the sensor portion 20 and FIG. 3B is an enlarged view of FIG. 3A.

The sensor portion 20 includes the sensitive portion 30 for sensing a magnetic field and the protruding portion 40 that protrudes in the longitudinal direction from the longitudinal ends of sensitive elements 31 (described below) of the sensitive portion 30.

The sensitive portion 30 includes a plurality of rectangular sensitive elements 31 whose planar shape has longitudinal and transverse directions. In FIGS. 3A and 3B, the horizontal direction on the page corresponds to the longitudinal direction of the sensitive elements 31, and the vertical direction on the page corresponds to the transverse direction of the sensitive elements 31. These multiple sensitive elements 31 are arranged to lie in parallel to each other along the longitudinal direction with respective gaps present therebetween in the transverse direction. The sensitive portion 30 includes connecting portions 32 for connecting respective adjacent sensitive elements 31 in series in a serpentine pattern, and terminal portions 33 connected to electric wires for electric current supply.

The sensitive portion 30 shown in FIG. 3A includes twenty-four sensitive elements 31. However, the sensitive portion 30 may include a single sensitive element 31 or multiple sensitive elements 31 more or less than twenty four.

Each sensitive element 31 is provided with a uniaxial magnetic anisotropy in a direction intersecting the longitudinal direction, e.g., in the transverse direction perpendicular to the longitudinal direction (i.e., in the width direction of the sensitive element 31). To further illustrate, a soft magnetic material (soft magnetic material layer 101 described below) constituting the sensitive element 31 is provided with a uniaxial magnetic anisotropy. Note that the direction intersecting the longitudinal direction may be a direction angled at greater than 45 degrees relative to the longitudinal direction.

In the magnetic sensor 1 (see FIG. 1) of the present embodiment, the sensitive elements 31 sense a magnetic field or any changes in the magnetic field to produce a magnetic impedance effect. In other words, in the magnetic sensor 1, the magnetic field or any changes in the magnetic field are measured based on changes in impedance of the sensitive portion 30, in which the sensitive elements 31 are connected in series. Hereinafter, the impedance of the sensitive portion 30 may be referred to as impedance of the magnetic sensor 1.

Each connecting portion 32 is disposed between ends of respective adjacent sensitive elements 31 to connect the respective adjacent sensitive elements 31 in series in a serpentine pattern.

The terminal portions 33 are disposed at two respective ends of the sensitive elements 31 that are not connected to any connecting portion 32. The terminal portions 33 serve as pad portions to be connected to electric wires for electric current supply. The terminal portions 33 may be sized to allow for the connection of the electric wires. While the terminal portions 33 are disposed on the right side of the sensitive portion 30 in the page of FIG. 1, both of the terminal portions 33 may be disposed on the left side, or one and the other of the terminal portions 33 may be respectively disposed on the right and left sides.

Here, a length of the sensitive element 31 in the longitudinal direction, or longitudinal length, is defined as a length L1. A width of the sensitive element 31 in the transverse direction, or transverse width, is defined as a width W1. A gap between two adjacent sensitive elements 31 is defined as a gap G1. For example, the length L1 of the sensitive element 31 is 1 mm to 10 mm, the width W1 is 10 μm to 150 μm, and the gap G1 is 10 μm to 150 μm. Note that the size (length L1, width W1, thickness, etc.) of each sensitive element 31, the number of sensitive elements 31, the gap G1 between the sensitive elements 31, and other parameters may be set depending on the size of the magnetic field to be sensed (i.e., measured) and other factors.

A combined transverse width of the multiple sensitive elements 31 is defined as a width W2. To further illustrate, the width W2 is a length along the transverse direction from an end of a sensitive element 31 that is located at one outermost side in the transverse direction (the upper side in FIG. 3A) to an end of another sensitive element 31 that is located at the other outermost side in the transverse direction (the lower side in FIG. 3A). The combined transverse width W2 of the multiple sensitive elements 31 depends on the width W1 of each sensitive element 31 and the gap G1 between the respective sensitive elements 31, and is about 0.5 mm to 10 mm, for example.

The protruding portion 40 is provided at both longitudinal ends of the sensitive elements 31 of the sensitive portion 30. One end of the sensor portion 20 (the sensitive portion 30 and the protruding portion 40) in the longitudinal direction (the left end in FIG. 3A) is hereinafter referred to as one longitudinal end. Similarly, the other end of the sensor portion 20 (the sensitive portion 30 and the protruding portion 40) in the longitudinal direction (the right end in FIG. 3A) is hereinafter referred to as the other longitudinal end.

The protruding portion 40 includes multiple first protruding portions 41 protruding in the longitudinal direction from the one longitudinal ends of the respective sensitive elements 31 and away from the sensitive elements 31. In the protruding portion 40 of the present embodiment, the other longitudinal ends of the first protruding portions 41 are continuous with the one longitudinal ends of the respective sensitive elements 31.

The protruding portion 40 further includes multiple second protruding portions 42 protruding in the longitudinal direction from the other longitudinal ends of the respective sensitive elements 31 and away from the sensitive elements 31. In the protruding portion 40 of the present embodiment, one longitudinal ends of the second protruding portions 42 are continuous with the other longitudinal ends of the respective sensitive elements 31.

To further illustrate, the multiple first and second protruding portions 41, 42 of the protruding portion 40 of the present embodiment protrude from the sensitive portion 30 in a comb-like pattern.

The first protruding portions 41 and the second protruding portions 42 are symmetrical about a central axis extending in the transverse direction at the longitudinal center of the magnetic sensor 1. A longitudinal length of the first protruding portions 41 and a longitudinal length of the second protruding portions 42 are defined as L2. Each first protruding portion 41 has a rectangular shape with the transverse width W1, which is equal to that of the sensitive element 31, and the longitudinal length L2. Each second protruding portion 42 has a rectangular shape with the transverse width W1, which is equal to that of the sensitive element 31, and the longitudinal length L2.

Additionally, taking the protruding portion 40 as a whole, the combined transverse width of the multiple first protruding portions 41 and the combined transverse width of the multiple second protruding portions 42 are each equal to the combined transverse width W2 of the multiple sensitive elements 31 of the sensitive portion 30.

The first protruding portions 41 are disposed on the side where external magnetic field lines enter the sensor portion 20. The first protruding portions 41 guide external magnetic field lines into the sensitive elements 31.

The second protruding portions 42 are disposed on the side where magnetic field lines exit the sensor portion 20. The second protruding portions 42 permit the magnetic field lines having passed through the sensitive elements 31 to pass directly therethrough to the outside.

In other words, the protruding portion 40 functions as a yoke for guiding magnetic field lines. As such, the protruding portion 40 includes a soft magnetic material (soft magnetic material layer 101 described below) that facilitates passage of the magnetic field lines.

Here, the first and second protruding portions 41, 42 of the protruding portion 40 protrude in the longitudinal direction. The phrase "protruding in the longitudinal direction" means that the direction in which the first and second protruding portions 41, 42 protrude with respect to the sensitive elements 31 includes a longitudinal component. Therefore, the first and second protruding portions 41, 42 may extend at an angle in the longitudinal direction, provided that they protrude in a direction different from the transverse direction. From the viewpoint of guiding magnetic field lines to the sensitive elements 31 or facilitating the guiding of magnetic field lines having passed through the sensitive elements 31 to the outside, it is preferable that the first and second protruding portions 41, 42 extend along the longitudinal direction, as shown in FIGS. 1 and 3, among others.

The magnetic sensor 1 of the present embodiment includes the protruding portion 40 protruding in the longitudinal direction from the longitudinal ends of the respective sensitive elements 31, so that if an external magnetic field of a predetermined magnitude is applied to the magnetic sensor 1, the magnitude of the magnetic field applied to the respective sensitive elements 31 can be uniform over the longitudinal direction. This improves the sensitivity of the magnetic sensor 1, which measures the magnetic field or any changes in the magnetic field based on changes in impedance of the sensitive portion 30, as compared to being without the protruding portion 40.

Referring to FIG. 2, a cross-sectional structure of the sensor portion 20 will now be described.

By way of example, the sensor portion 20 includes four soft magnetic material layers 101*a*, 101*b*, 101*c*, 101*d* from the side of the substrate 10. The sensor portion 20 further includes a magnetic domain suppression layer 102*a*, between the soft magnetic material layer 101*a* and the soft magnetic material layer 101*b*, for suppressing generation of closure magnetic domains in the soft magnetic material layer 101*a* and the soft magnetic material layer 101*b*. The sensor portion 20 further includes a magnetic domain suppression layer 102*b*, between the soft magnetic material layer 101*c* and the soft magnetic material layer 101*d*, for suppressing generation of closure magnetic domains in the soft magnetic material layer 101*c* and the soft magnetic material layer 101*d*. The sensor portion 20 further includes a conductor layer 103, between the soft magnetic material layer 101*b* and the soft magnetic material layer 101*c*, for reducing resistance (herein, electric resistance) of the sensitive portion 30. The soft magnetic material layers 101*a*, 101*b*, 101*c*, 101*d* are hereinafter collectively referred to as soft magnetic material layers 101 unless the distinction is necessary. The magnetic domain suppression layers 102*a*, 102*b* are hereinafter collectively referred to as magnetic domain suppression layers 102 unless the distinction is necessary.

Each soft magnetic material layer 101 is composed of a soft magnetic material of an amorphous alloy that provides a magnetic impedance effect. The soft magnetic material constituting the soft magnetic material layers 101 is preferably an amorphous alloy consisting of a Co-based alloy with additions of high melting point metals such as Nb, Ta, and W. Examples of such Co-based alloys include CoNbZr, CoFeTa, CoWZr, and CoFeCrMnSiB. Each soft magnetic material layer 101 is 100 nm to 1 μm thick, for example. The thicknesses of the respective soft magnetic material layers 101 may be equal to or different from each other.

The soft magnetic material refers to a so-called low coercivity material that is easily magnetizable by an external magnetic field but quickly returns to a non-magnetized or low magnetized state upon removal of the external magnetic field.

As used herein, amorphous alloys or metals refer to alloys or metals that have a structure without an ordered arrangement of atoms like in crystals and are formed by sputtering or other methods.

Each magnetic domain suppression layer 102 suppresses generation of closure magnetic domains in the corresponding upper and lower soft magnetic material layers 101 sandwiching that magnetic domain suppression layer 102.

In general, multiple magnetic domains having different magnetization directions are often formed in the soft magnetic material layers 101. This leads to formation of closure magnetic domains having an annular magnetization direction. As an external magnetic field increases, magnetic domain walls move. As a result, an area of the magnetic domain whose magnetization direction is the same as the direction of the external magnetic field increases, while an area of the magnetic domain whose magnetization direction is opposite the direction of the external magnetic field decreases. As the external magnetic field further increases, magnetization rotation occurs in the magnetic domain whose magnetization direction is different from the direction of the external magnetic field, whereby the magnetization direction of that domain is oriented in the same direction as the external magnetic field. Finally, the magnetic domain wall that has existed between adjacent magnetic domains disappears, and the adjacent magnetic domains combine into a magnetic domain (a single magnetic domain). In other words, in the presence of the closure magnetic domains, a Barkhausen effect occurs due to changes in the external magnetic field, whereby the magnetic domain walls constituting the closure magnetic domains move in a stepwise and discontinuous manner. The discontinuous movements of the magnetic domain walls would produce noise in the magnetic sensor 1, which may reduce the S/N ratio in the output obtained from the magnetic sensor 1. Each magnetic domain suppression layer 102 suppresses formation of multiple magnetic domains of small areas in the corresponding soft magnetic material layers 101 on and under that magnetic domain suppression layer 102. This suppresses formation of the closure magnetic domains, which in turn suppresses the noise that might otherwise be produced from discontinuous movements of the magnetic domain walls. Note that the magnetic domain suppression layers 102 may at least serve to reduce the number of magnetic domains formed, i.e., increase the size of each magnetic domain, as compared to an absence of the magnetic domain suppression layers 102.

Example materials for these magnetic domain suppression layers 102 include non-magnetic materials, such as Ru and $SiO_2$, and non-magnetic amorphous metals, such as CrTi, AlTi, CrB, CrTa, and CoW. Each magnetic domain suppression layer 102 may be 10 nm to 100 nm thick, for example.

The conductor layer 103 reduces the resistance of the sensitive portion 30. More specifically, the conductor layer 103 is more conductive than the soft magnetic material layers 101 and reduces the resistance of the sensitive portion 30 as compared to an absence of the conductor layer 103. The magnetic sensor 1 measures a magnetic field or any change in the magnetic field as a change in impedance (hereinafter denoted as impedance Z) in response to passage of an alternating current between the two terminal portions 33. Hereinafter, such a change in impedance Z is denoted as ΔZ. In this context, a higher frequency of the applied alternating current leads to a larger rate of change in impedance Z relative to a change in the external magnetic field (hereinafter denoted as ΔH). Hereinafter, such a rate of change in impedance Z relative to ΔH is denoted as an impedance change rate ΔZ/ΔH. However, increasing the frequency of the alternating current in the absence of the conductor layer 103 would rather decrease the impedance change rate ΔZ/ΔH due to the floating capacitance of the magnetic sensor 1. Assuming that the resistance of the sensitive portion 30 is R, the floating capacitance is C, and the magnetic sensor 1 is a parallel circuit of the resistance R and the floating capacitance C, a relaxation frequency $f_0$ of the magnetic sensor 1 can be expressed by Expression (1) below.

[Expression 1]

$$f_0 = \frac{1}{2\pi RC} \quad (1)$$

As can be understood from Expression (1), a larger floating capacitance C leads to a smaller relaxation frequency $f_0$, and if the frequency of the alternating current is higher than the relaxation frequency $f_0$, the impedance change rate ΔZ/ΔH would rather decrease. To avoid this, the conductor layer 103 is provided to reduce the resistance R of the sensitive portion 30 and thereby increase the relaxation frequency $f_0$.

The conductor layer 103 is preferably made of a highly conductive metal or alloy, and more preferably made of a highly conductive and non-magnetic metal or alloy. Example materials for the conductor layer 103 include metals such as Al, Cu, Ag, and Au. The conductor layer 103 may be 10 nm to 1 μm thick, for example. The conductor layer 103 may at least serve to reduce the resistance of the sensitive portion 30 as compared to an absence of the conductor layer 103.

The upper and lower soft magnetic material layers 101 sandwiching the corresponding magnetic domain suppression layer 102 and the upper and lower soft magnetic material layers 101 sandwiching the conductor layer 103 are antiferromagnetically coupled (AFC) with each other. The antiferromagnetic coupling of the lower and upper soft magnetic material layers 101 suppresses a demagnetizing field, helping improve the sensitivity of the magnetic sensor 1.

In the present embodiment, the sensor portion 20 includes the soft magnetic material layers 101, the magnetic domain suppression layers 102, and the conductor layer 103. However, this configuration of the sensor portion 20 is not limiting; the sensor portion 20 does not necessarily include the magnetic domain suppression layers 102 or the conductor layer 103, provided that it includes at least the soft magnetic material layers 101.

Configuration of Guiding Portion 50

The guiding portion 50 of the magnetic sensor 1 will now be described.

As described above, the guiding portion 50 is positioned opposite the protruding portion 40 of the sensor portion 20. In the present embodiment, the guiding portion 50 is positioned to overlap the protruding portion 40 of the sensor portion 20 and faces the upper surface of the protruding portion 40. Specifically, the guiding portion 50 includes a first guiding member 51 overlapping the first protruding portions 41 of the protruding portion 40 and a second guiding member 52 overlapping the second protruding portions 42 of the protruding portion 40. The first and second guiding members 51, 52 of the guiding portion 50 do not overlap the sensitive portion 30 of the sensor portion 20.

As will be detailed below, the first guiding member 51 guides external magnetic field lines and focuses them in the first protruding portions 41. The second guiding member 52 guides the magnetic field lines having passed through the sensitive elements 31 and the second protruding portions 42 and dissipates them to the outside. In the present embodiment, the first guiding member 51 or the second guiding member 52 of the guiding portion 50 is an example of the guiding member.

The first and second guiding members 51, 52 have the same shape. In this example, in a top view of the magnetic sensor 1 (i.e., seen from the top side in FIG. 2), the first and second guiding member 51, 52 have a rectangular planar shape with sides extending in the longitudinal and transverse directions. Also, in a top view of the magnetic sensor 1, the first and second guiding member 51, 52 are symmetrically arranged about a central axis extending in the transverse direction at the longitudinal center of the magnetic sensor 1.

A longitudinal length of the first and second guiding members 51, 52 is defined hereinafter as a length L3. A transverse width of the first and second guiding members 51, 52 is defined hereinafter as a width W3. Additionally, a thickness of the first and second guiding members 51, 52 (thickness in the vertical direction) is defined hereinafter as a thickness D1.

In a top view of the magnetic sensor 1, the first guiding member 51 overlaps the multiple first protruding portions 41 of the protruding portion 40. The first guiding member 51 is not disposed over the sensitive portion 30 and over the boundaries between the respective sensitive elements 31 of the sensitive portion 30 and the respective first protruding portions 41 of the protruding portion 40.

In the present embodiment, the first guiding member 51 overlaps partial regions of one longitudinal ends of the first protruding portions 41. The first guiding member 51 is not disposed over regions of the other longitudinal ends of the first protruding portions 41. To further illustrate, the regions of the other longitudinal ends of the first protruding portions 41 are exposed without being covered by the first guiding member 51.

A longitudinal length of the portion of the first guiding member 51 overlapping the first protruding portions 41 is defined as a length X1. In this example, the length X1 of overlap between the first guiding member 51 and the first protruding portions 41 is about two-thirds the length L2 of the first protruding portions 41. The length X1 of overlap between the first guiding member 51 and the first protruding portions 41 is preferably from 10% to 100%, more preferably from 20% to 80%, and even more preferably from 30% to 70%, of the length L2 of the first protruding portions 41.

The first guiding member 51 has a longitudinal length L3 that is longer than the longitudinal length L2 of the first protruding portions 41 (L3>L2). The first guiding member 51 has one longitudinal end extending beyond the one longitudinal ends of the first protruding portions 41. To further illustrate, the one longitudinal end of the first guiding member 51 does not overlap the first protruding portions 41.

The longitudinal length of the portion of the first guiding member 51 extending beyond the first protruding portions 41 is defined as a length X2. In the present embodiment, the length X2 by which the first guiding member 51 extends beyond the first protruding portions 41 is longer than the length X1 of overlap between the first guiding member 51 and the first protruding portions 41 (X2>X1). This makes it easier for the first guiding member 51 to focus external magnetic field lines in the first protruding portions 41, as compared to when the length X2 by which the first guiding member 51 extends beyond the first protruding portions 41 is shorter than the length X1 of overlap between the first guiding member 51 and the first protruding portions 41.

The first guiding member 51 of the present embodiment has a transverse width W3 that is larger than the combined transverse width of the multiple first protruding portions 41 (i.e., the combined transverse width W2 of the multiple sensitive elements 31). As such, the first guiding member 51 is disposed across and over all first protruding portions 41 arranged in the transverse direction.

In a top view of the magnetic sensor 1, the second guiding member 52 overlaps the multiple second protruding portions 42 of the protruding portion 40, similarly to the first guiding member 51. The second guiding member 52 is not disposed over the sensitive portion 30 and over the boundaries between the respective sensitive elements 31 of the sensitive portion 30 and the respective second protruding portions 42 of the protruding portion 40.

In the present embodiment, the second guiding member 52 overlaps partial regions of the other longitudinal ends of the second protruding portions 42. The second guiding member 52 is not disposed over regions of the one longitudinal ends of the second protruding portions 42. To further illustrate, the regions of the one longitudinal ends of the second protruding portions 42 are exposed without being covered by the second guiding member 52.

A longitudinal length of the portion of the second guiding member 52 overlapping the second protruding portions 42 is the length X1, equal to the length of overlap between the first guiding member 51 and the first protruding portions 41. In this example, the length X1 of overlap between the second guiding member 52 and the second protruding portions 42 is about two-thirds the length L2 of the second protruding portions 42. Similarly to the first guiding member 51, the length X1 of overlap between the second guiding member 52 and the second protruding portions 42 is preferably from 10% to 100%, more preferably from 20% to 80%, and even more preferably from 30% to 70%, of the length L2 of the second protruding portions 42.

Similarly to the first guiding member 51, the second guiding member 52 has the longitudinal length L3 that is longer than the longitudinal length L2 of the second protruding portions 42 (L3>L2). The second guiding member 52 has the other longitudinal end extending beyond the other longitudinal ends of the second protruding portions 42. To further illustrate, the other longitudinal end of the second guiding member 52 does not overlap the second protruding portions 42.

The length of the portion of the second guiding member 52 extending beyond the second protruding portions 42 is the length X2, equal to the length of the portion of the first guiding member 51 extending beyond the first protruding portions 41. The length X2 by which the second guiding member 52 extends beyond the second protruding portions 42 is longer than the length X1 of overlap between the second guiding member 52 and the second protruding portions 42 (X2>X1). This makes it easier for the second guiding member 52 to dissipate magnetic field lines having passed through the second protruding portions 42 to the outside, as compared to when the length X2 by which the second guiding member 52 extends beyond the second protruding portions 42 is shorter than the length X1 of overlap between the second guiding member 52 and the second protruding portions 42.

In the following description, the length X1 of overlap between the first guiding member 51 and the first protruding portions 41 and the length X1 of overlap between the second guiding member 52 and the second protruding portions 42 may be collectively referred to as "the length X1 of overlap between the guiding portion 50 and the protruding portion 40" or the like.

Similarly to the first guiding member 51, the second guiding member 52 of the present embodiment has the transverse width W3 that is larger than the combined transverse width of the multiple second protruding portions 42 (i.e., the combined transverse width W2 of the multiple sensitive elements 31) (W3>W2). As such, the second guiding member 52 is disposed across and over all second protruding portions 42 arranged in the transverse direction.

Greater longitudinal length L3, transverse width W3, and thickness D1 are preferred to make it easier for the first and second guiding members 51, 52 to focus external magnetic field lines and dissipate magnetic field lines to the outside. However, such greater dimensions often lead to an increased size of the magnetic sensor 1. The longitudinal length L3 and the transverse width W3 of the first and second guiding members 51, 52 can be about 1 mm to 30 mm, for example, depending on factors including the size of the sensitive portion 30 and the protruding portion 40 and the type of soft magnetic material used as the first and second guiding members 51, 52.

The thickness D1 of the first and second guiding members 51, 52 can be about 0.1 mm to 10 mm, for example.

The first and second guiding members 51, 52 of the guiding portion 50 are made of a soft magnetic material. The first and second guiding members 51, 52 are preferably made of a soft magnetic material with a higher magnetic permeability than the soft magnetic material constituting the soft magnetic material layers 101 of the sensor portion 20 described above.

Possible soft magnetic materials for the first and second guiding members 51, 52 include ceramics and alloys with a high magnetic permeability. Examples of such soft magnetic materials include ferrites (soft ferrites), permalloys, and sendusts, of which ferrites or permalloys are preferred, and ferrites are more preferred. Example of ferrites include an MnZn ferrite with an initial magnetic permeability of 2500±25% and a saturation magnetic flux density Bs of 420 mT.

When a highly conductive soft magnetic material is used as the first guiding member 51 or the second guiding member 52, it is preferable that an insulating layer be disposed on the surface of the first guiding member 51 or the second guiding member 52 or an insulating member be interposed between the first guiding member 51 and the first protruding portions 41 or between the second guiding member 52 and the second protruding portions 42. Such an arrangement can prevent conduction of the multiple first protruding portions 41 or the multiple second protruding portions 42 through the first guiding member 51 or the second guiding member 52.

The insulating layer on the surface of the first guiding member 51 or the second guiding member 52 or the insulating member between the first guiding member 51 and the first protruding portions 41 or between the second guiding member 52 and the second protruding portions 42 is preferably made of a soft magnetic material with a high magnetic permeability.

Manufacture of Magnetic Sensor 1

For example, the magnetic sensor 1 shown in FIGS. 1 to 3 is manufactured as follows.

First, a photoresist pattern is formed on the substrate 10 so as to cover the surface of the substrate 10 except for the planar geometry of the sensor portion 20 (sensitive portion 30, protruding portion 40), using a known photolithography technique. Then, the soft magnetic material layer 101a, the magnetic domain suppression layer 102a, the soft magnetic material layer 101b, the conductor layer 103, the soft magnetic material layer 101c, the magnetic domain suppression layer 102b, and the soft magnetic material layer 101d are sequentially deposited on the substrate 10 by, for example, sputtering. The soft magnetic material layer 101a, the magnetic domain suppression layer 102a, the soft magnetic material layer 101b, the conductor layer 103, the soft magnetic material layer 101c, the magnetic domain suppression layer 102b, and the soft magnetic material layer 101d deposited on the photoresist are removed together with the photoresist. This leaves on the substrate 10 a laminate consisting of the soft magnetic material layer 101a, the magnetic domain suppression layer 102a, the soft magnetic material layer 101b, the conductor layer 103, the soft magnetic material layer 101c, the magnetic domain suppression layer 102b, and the soft magnetic material layer 101d, which is shaped into the planar shape of the sensitive portion 30 and the protruding portion 40. In this way, the laminate structure of the sensor portion 20 shown in FIG. 2 is formed.

The soft magnetic material layers 101 are provided with a uniaxial magnetic anisotropy in a direction intersecting the longitudinal direction, e.g., in the transverse direction. This impartation of the uniaxial magnetic anisotropy can be done by, for example, subjecting the sensitive elements 31 formed on the substrate 10 to heat treatment at 400° C. in a rotating magnetic field of 3 kG (0.3 T) (heat treatment in the rotating magnetic field) and subsequent heat treatment at 400° C. in a static magnetic field of 3 kH (0.3 T) (heat treatment in the static magnetic field). The impartation of the uniaxial magnetic anisotropy may be done using a magnetron sputtering method during deposition of the soft magnetic material layers 101 constituting the sensitive elements 31, instead of performing the heat treatment in the rotating magnetic field and the heat treatment in the static magnetic field. Specifically, the magnetic field generated by magnets used in the magnetron sputtering method imparts the uniaxial magnetic anisotropy to the soft magnetic material layers 101 concurrently with the deposition thereof.

The first and second guiding members 51, 52, which constitute the guiding portion 50, are then loaded on the first and second protruding portions 41, 42, respectively, of the protruding portion 40 in the sensor portion 20 formed on the substrate 10.

The above process produces the magnetic sensor 1 with the sensor portion 20, including the sensitive portion 30 and the protruding portion 40 disposed on the substrate 10, and the guiding portion 50 disposed on the protruding portion 40 of the sensor portion 20.

In the manufacturing method described above, the connecting portions 32 and the terminal portions 33 of the sensitive portion 30 as well as the protruding portion 40 are formed integrally with the sensitive elements 31 of the sensitive portion 30.

Alternatively, the connecting portions 32 and the terminal portions 33 may be formed of any conductive metal such as Al, Cu, Ag, or Au, separately from the sensitive elements 31. Still alternatively, any conductive metal such as Al, Cu, Ag, or Au, may be laminated on the connecting portions 32 and the terminal portions 33 formed integrally with the sensitive elements 31.

Further, the protruding portion 40 may be made of a different type of soft magnetic material than the sensitive elements 31.

Variation of Guiding Portion 50

A variation of the guiding portion 50 will now be described.

Figure 4:
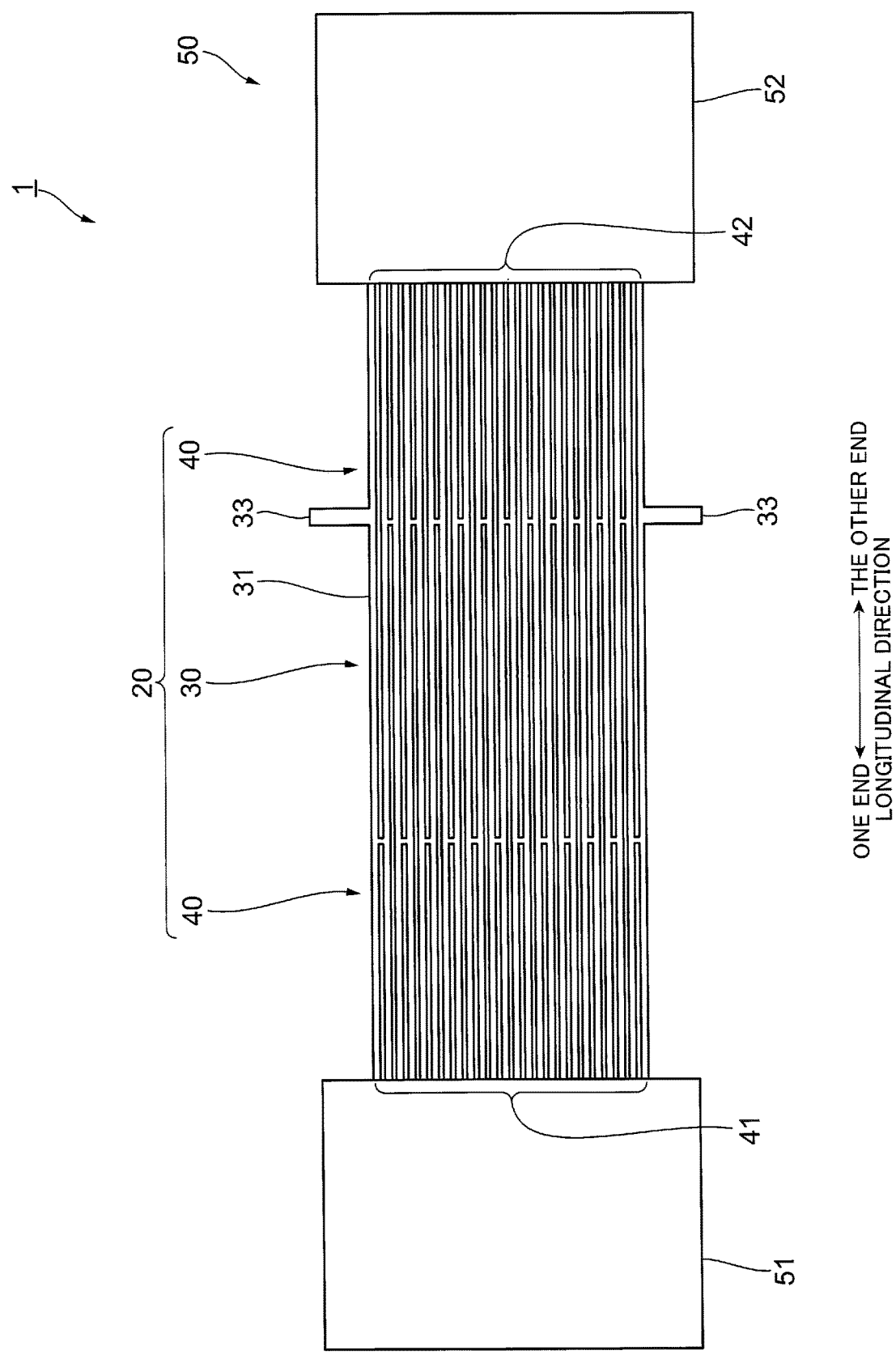
FIG. 4 illustrates a variation of a guiding portion, providing a top view of the magnetic sensor.

FIG. 4 illustrates a variation of the guiding portion 50, providing a top view of the magnetic sensor 1. Note that elements similar to those of the magnetic sensor 1 shown in FIGS. 1 to 3 will be referred to by the same reference numerals and detailed description thereof will be omitted.

In the example shown in FIGS. 1 to 3, the guiding portion 50 overlaps the protruding portion 40 of the sensor portion 20. In contrast, in the example shown in FIG. 4, the guiding portion 50 is longitudinally adjacent to the protruding portion 40 of the sensor portion 20 and longitudinally opposite the longitudinal end of the protruding portion 40.

Specifically, in the guiding portion 50 shown in FIG. 4, the first and second guiding members 51, 52 are disposed on the substrate 10. The first guiding member 51 is longitudinally adjacent to the first protruding portions 41 and opposite the one longitudinal ends of the first protruding portions 41. To further illustrate, the first guiding member 51 is in contact with the one longitudinal ends of the first protruding portions 41. The second guiding member 52 is longitudinally adjacent to the second protruding portions 42 and opposite the other longitudinal ends of the second protruding portions 42. To further illustrate, the second guiding member 52 is in contact with the other longitudinal ends of the second protruding portions 42.

In the guiding portion 50 shown in FIG. 4, as with the example shown in FIGS. 1 and 2, the first guiding member 51 guides external magnetic field lines and focuses them in the first protruding portions 41. The second guiding member 52 guides the magnetic field lines having passed through the sensitive elements 31 and the second protruding portions 42 and dissipates them to the outside.

Functions of Sensitive Portion 30

Functions of the sensitive portion 30 in the magnetic sensor 1 will now be described.

Figure 5:
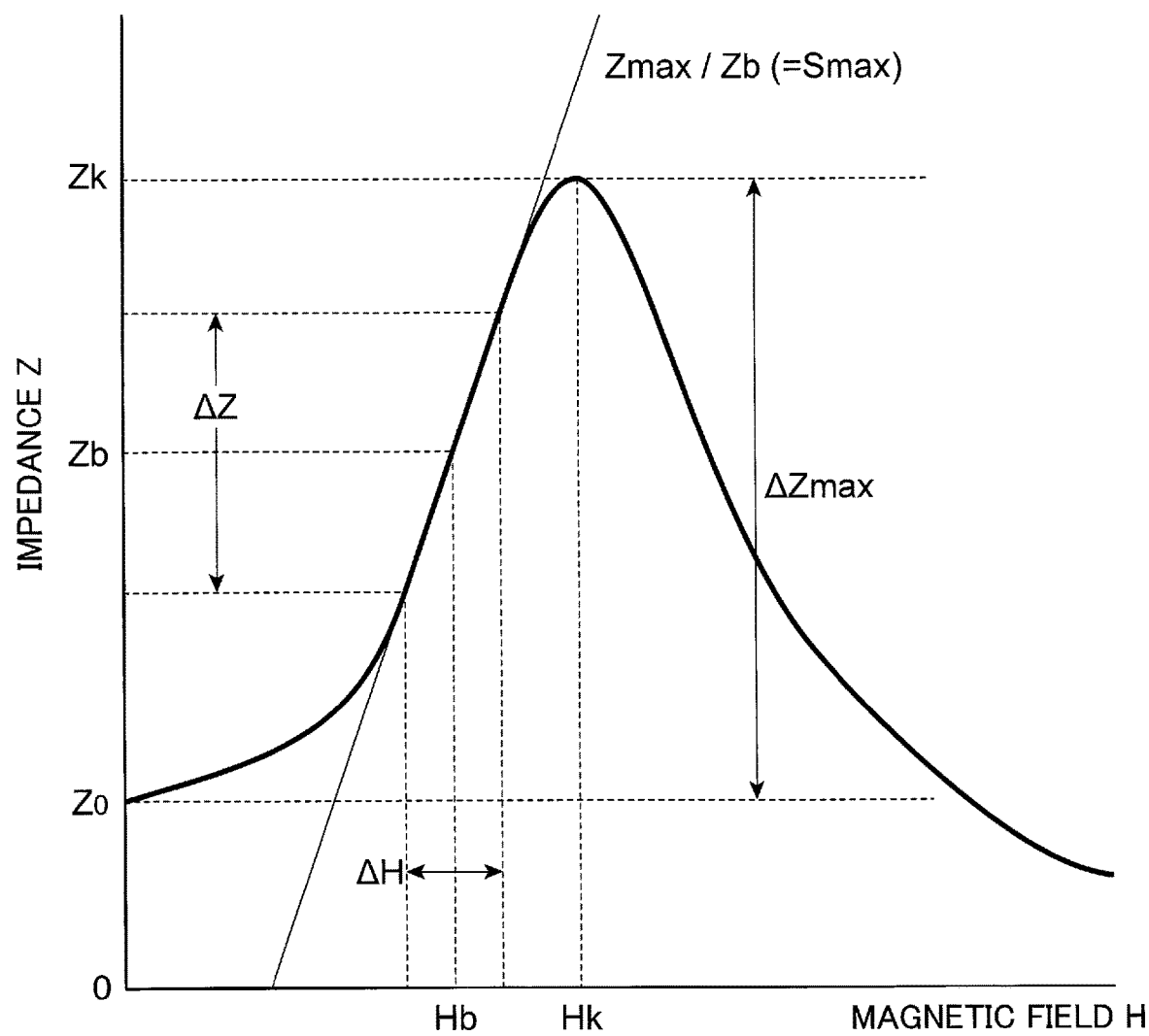
FIG. 5 illustrates relationship between a magnetic field applied in the longitudinal direction of sensitive elements and impedance of a sensitive portion in the magnetic sensor.

FIG. 5 illustrates relationship between a magnetic field applied in the longitudinal direction of the sensitive elements 31 in the magnetic sensor 1 and impedance of the sensitive portion 30. In FIG. 5, the horizontal axis represents the magnetic field H, and the vertical axis represents the impedance Z.

As shown in FIG. 5, the impedance Z of the sensitive portion 30 takes a value Z0 when the magnetic field H applied to the sensitive elements 31 in the longitudinal direction is 0. The impedance Z increases with an increase in the magnetic field H and reaches its maximum value Zk when the magnetic field H reaches an anisotropic magnetic field Hk. The impedance Z becomes smaller once the magnetic field H exceeds the anisotropic magnetic field Hk. The amount of change (Zk−Z0) in impedance Z from the impedance Z0 to the maximum value Zk, is denoted as an impedance change amount $\Delta Zmax$.

By use of a portion where the amount of change $\Delta Z$ in the impedance Z relative to the amount of change $\Delta H$ in the magnetic field H is large, namely a portion where an impedance change rate $\Delta Z/\Delta H$ is large within the region where the applied magnetic field H is smaller than the anisotropic magnetic field Hk, a slight change $\Delta H$ in the magnetic field H can be extracted as the amount of change $\Delta Z$ in the impedance Z. In FIG. 5, the center of the portion of the magnetic field H where the impedance change rate $\Delta Z/\Delta H$ is large is denoted as a magnetic field Hb. That is, the amount of change $\Delta H$ in the magnetic field H at or near the magnetic field Hb (in the region shown by a double arrowed line in FIG. 5) can be measured with high accuracy.

Here, a value obtained by dividing the amount of impedance change Zmax per unit magnetic field in the portion where the impedance change rate $\Delta Z/\Delta H$ is largest, i.e., in the magnetic field Hb, by the impedance Z in the magnetic field Hb (hereinafter denoted as the impedance Zb) is the sensitivity (Zmax/Zb). A higher sensitivity Zmax/Zb provides a larger magnetic impedance effect, which facilitates measurement of the magnetic field or any changes in the magnetic field. In other words, a steeper change in the impedance Z relative to the magnetic field H corresponds to a higher sensitivity Zmax/Zb. In this context, a smaller anisotropic magnetic field Hk is preferred. Also, a larger amount of impedance change $\Delta Zmax$ is preferred.

In use of the magnetic sensor 1 of the present embodiment, for example, a magnetic field Hb generated by passing an electric current through a coil is applied as an external bias magnetic field so that magnetic flux passes through the sensitive elements 31 of the sensitive portion 30 in the longitudinal direction. The sensitivity Zmax/Zb is hereinafter denoted as sensitivity Smax.

Effects of Guiding Portion 50

Some effects of the guiding portion 50 in the magnetic sensor 1 of the present embodiment will now be described in comparison to a conventional magnetic sensor without the guiding portion 50 (hereinafter referred to as a conventional magnetic sensor). The conventional magnetic sensor is assumed to have the same configuration as the magnetic sensor 1 of the present embodiment, except that it does not include the guiding portion 50. Elements of the conventional sensor similar to those of the magnetic sensor 1 of the present embodiment will be referred to by the same reference numerals.

Figure 6:
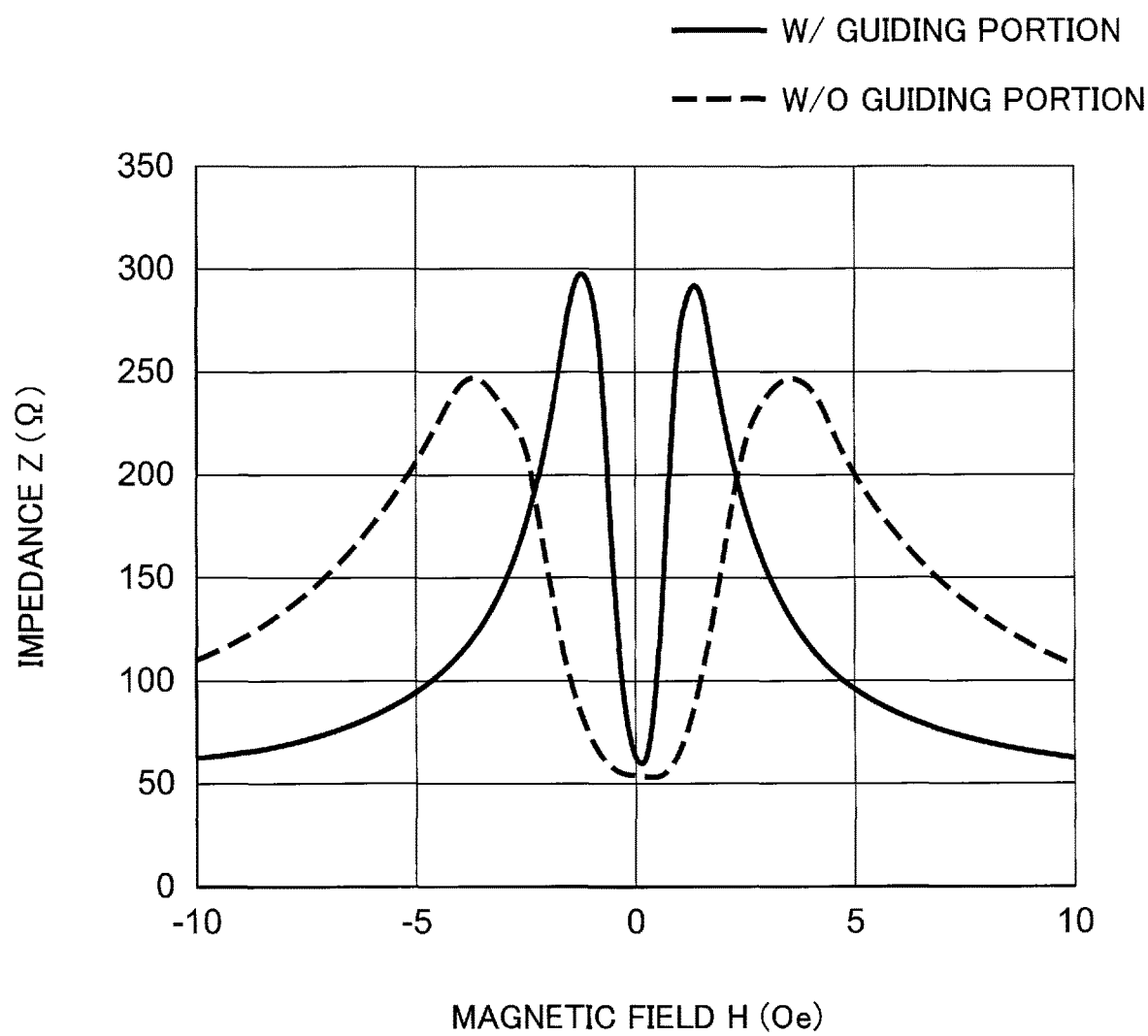
FIG. 6 illustrates example relationship between impedance and a magnetic field for the magnetic sensor according to an embodiment and a conventional magnetic sensor.

FIG. 6 illustrates example relationship between the impedance Z and the magnetic field H for the magnetic sensor 1 according to the present embodiment and the conventional magnetic sensor. In FIG. 6, the horizontal axis represents the magnetic field H (Oe), and the vertical axis represents the impedance Z ($\Omega$). FIG. 6 shows the impedance Z in the magnetic field H range of ±10 Oe. In FIG. 6, the graph shown with notation "with (w/) guiding portion" corresponds to the magnetic sensor 1 of the present embodiment including the guiding portion 50, while the graph shown with notation "without (w/o) guiding portion" corresponds to the conventional magnetic sensor without the guiding portion 50.

FIG. 6 shows measurements taken by passing a 50 MHz high-frequency current between the two terminal portions 33 in each of the magnetic sensor 1 of the present embodiment and the conventional magnetic sensor.

For the magnetic sensor 1 of the present embodiment and the conventional magnetic sensor, the sensitive portion 30 and the protruding portion 40 were shaped similarly to what is shown in FIG. 3. Specifically, twenty-four sensitive elements 31 were used in the sensitive portion 30, with each sensitive element 31 having a longitudinal length L1 of 4.3 mm and a transverse width W1 of 0.1 mm and with a transverse interval between two adjacent sensitive elements 31 being set to 0.05 mm. The longitudinal length L2 of the protruding portion 40 (first and second protruding portions 41, 42) was set to 3.0 mm.

For the magnetic sensor 1 of the present embodiment, ferrite with a longitudinal length L3 of 18 mm, a transverse width W3 of 10 mm, and a thickness D1 of 2 mm was used as the first and second guiding members 51, 52 of the guiding portion 50. The length X1 of each overlap between the guiding portion 50 and the protruding portion 40 in the magnetic sensor 1 was set to 2.0 mm.

As shown in FIG. 6, the magnetic sensor 1 of the present embodiment with the guiding portion 50 has a smaller anisotropic magnetic field Hk and a steeper change in the impedance Z relative to the magnetic field H, as compared to the conventional magnetic sensor without the guiding portion 50.

Under application of an external magnetic field of a predetermined magnitude, the conventional magnetic sensor without the guiding portion 50 may have a difference in the density of magnetic field lines (hereinafter referred to as "magnetic flux density") longitudinally passing through the sensitive elements 31 of the sensitive portion 30, between the sensitive elements 31 located at both outermost sides in the transverse direction and those located in the center portion in the transverse direction. As a result, the conventional magnetic sensor may have a difference in the magnitude of the anisotropic magnetic field Hk, where the maximum impedance Z is largest, between the sensitive elements 31 located at both outermost sides in the transverse direction and those located in the center portion in the transverse direction in the sensitive portion 30. For example, in the conventional magnetic sensor, the anisotropic magnetic field Hk for the sensitive elements 31 located at both outermost sides in the transverse direction may be higher than the anisotropic magnetic field Hk for the sensitive elements 31 located at the center portion in the transverse direction. This may result in the conventional magnetic sensor as a whole having a less steep change in impedance Z relative to the magnetic field H, which may decrease its sensitivity for measuring the magnetic field or changes in the magnetic field.

In contrast, the magnetic sensor 1 of the present embodiment includes the guiding portion 50 that can guide the magnetic field lines, so that differences in magnetic flux density between the sensitive elements 31 located at both outermost sides in the transverse direction and those located in the center portion in the transverse direction are less likely to occur.

Specifically, the magnetic sensor 1 of the present embodiment can collect magnetic field lines from a wide external area using the first guiding member 51 of the guiding portion 50. The magnetic field lines collected by the first guiding member 51 are then guided through the first protruding portions 41, disposed opposite the first guiding member 51, to the respective sensitive elements 31.

Further, the magnetic sensor 1 of the present embodiment allows the magnetic field lines having passed through the respective sensitive elements 31 to pass directly through the second protruding portions 42. The magnetic field lines having passed through the second protruding portions 42 are then easily dissipated to the outside by the second guiding member 52 of the guiding portion 50 disposed opposite the second protruding portions 42.

Thus, the magnetic sensor 1 of the present embodiment facilities passage of magnetic field lines through each sensitive element 31 in parallel to the longitudinal direction, increasing the magnetic flux density of each sensitive element 31. As a result, the magnetic sensor 1 of the present embodiment is less likely to have a difference in magnetic flux density between the sensitive elements 31 located at both outermost sides in the transverse direction and those located in the center portion in the transverse direction. Further, in the magnetic sensor 1 of the present embodiment, the anisotropic magnetic field Hk for each sensitive element 31 is lowered due to the higher magnetic flux density of each sensitive element 31, so that the magnetic sensor 1 as a whole has a steeper change in impedance Z relative to the magnetic field H, as shown in FIG. 6.

As described above, the magnetic sensor 1 of the present embodiment includes the guiding portion 50 disposed opposite the protruding portion 40, which improves the sensitivity for measuring the magnetic field or changes in the magnetic field.

The following paragraphs describe differences in characteristics of the magnetic sensor 1 due to differences in configuration of the guiding portion 50 of the magnetic sensor 1, more specifically, differences in the length X1 of overlap between the guiding portion 50 and the protruding portion 40.

Figure 7:
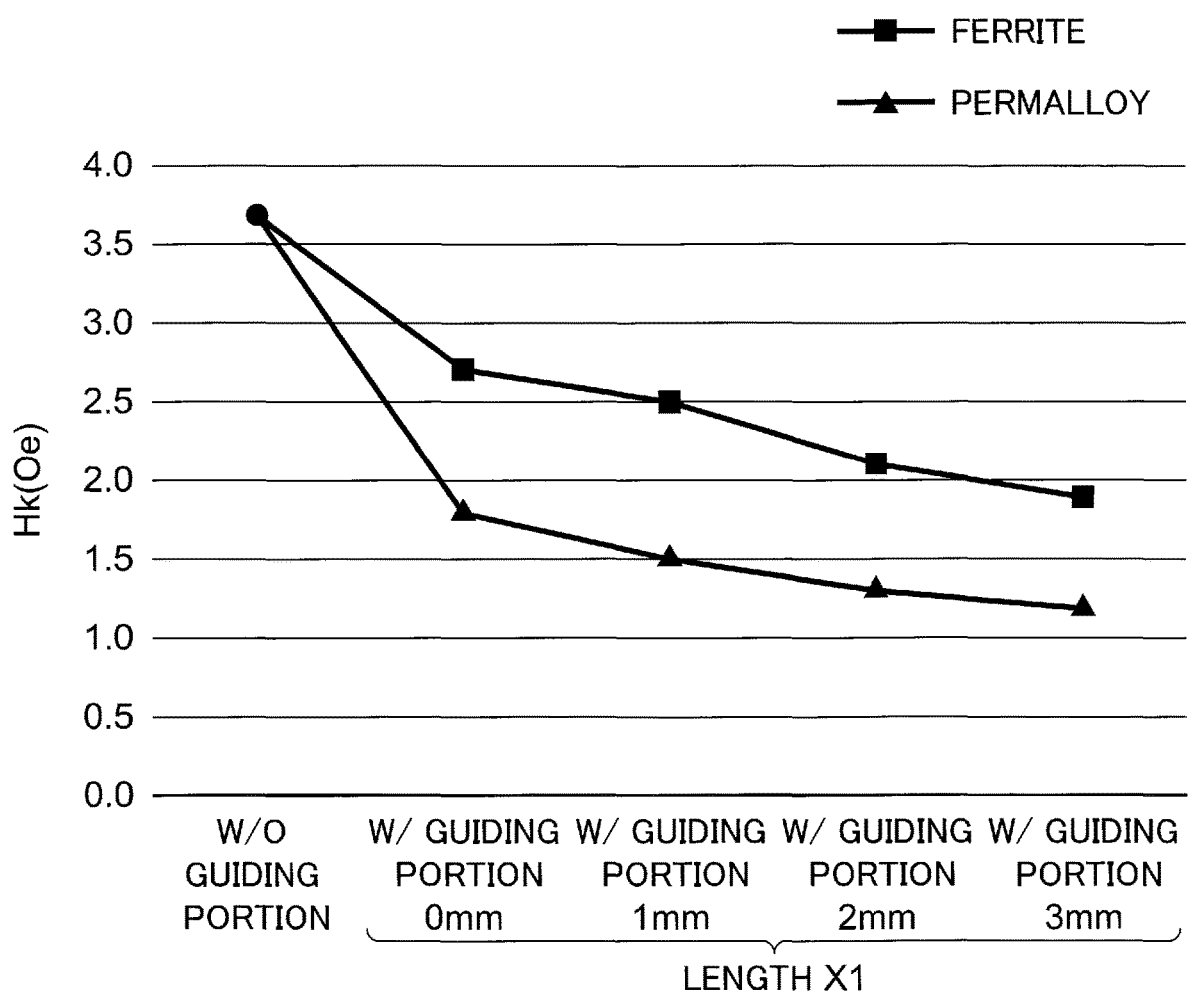
FIG. 7 illustrates relationship between the configuration of the guiding portion of the magnetic sensor and an anisotropic magnetic field.
Figure 8:
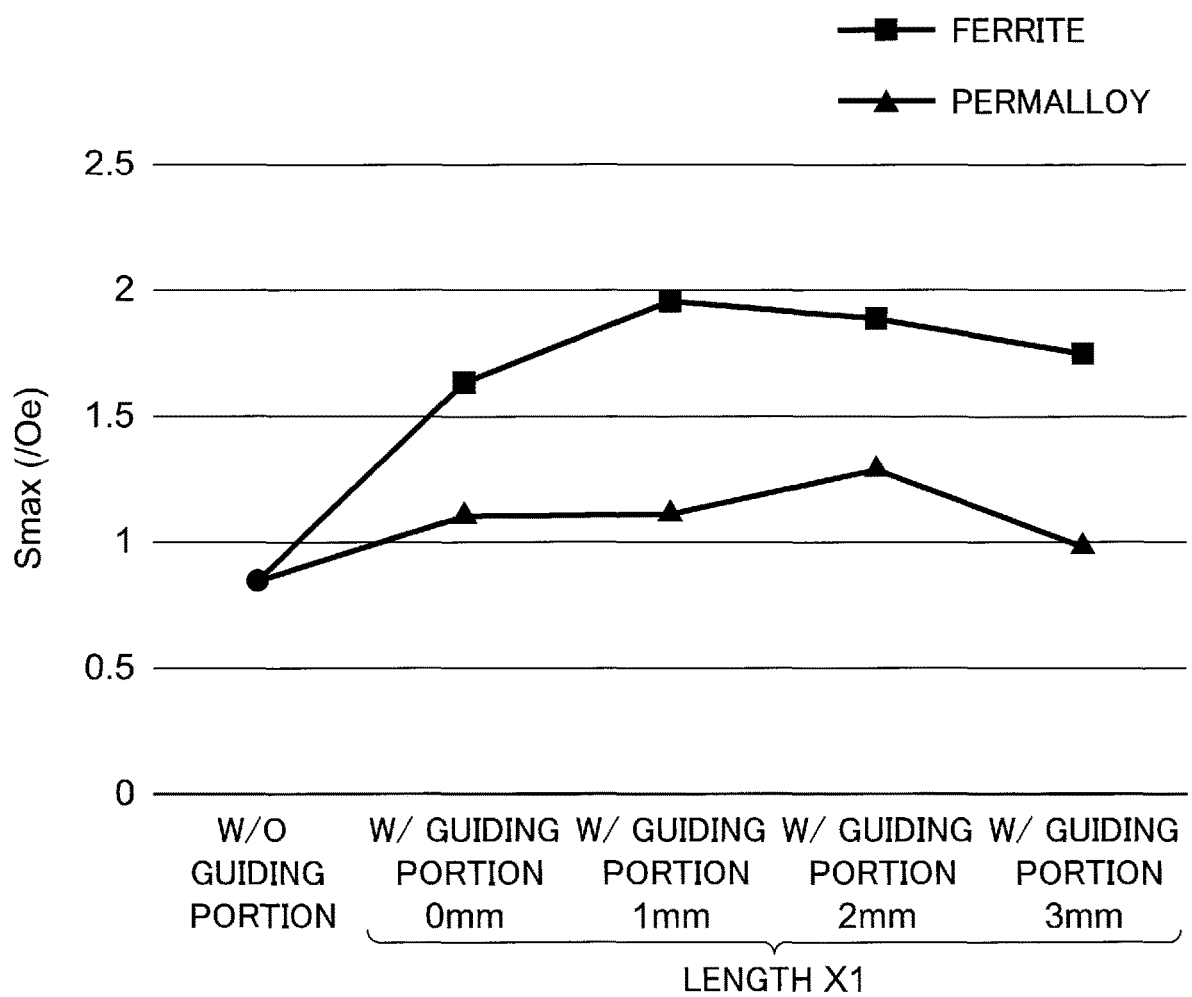
FIG. 8 illustrates relationship between the configuration of the guiding portion of the magnetic sensor and the sensitivity.

FIG. 7 illustrates relationship between the configuration of the guiding portion 50 of the magnetic sensor 1 and the anisotropic magnetic field Hk. FIG. 8 illustrates relationship between the configuration of the guiding portion 50 of the magnetic sensor 1 and the sensitivity Smax. FIGS. 7 and 8 also show the anisotropic magnetic field Hk and the sensitivity Smax for the conventional magnetic sensor.

FIGS. 7 and 8 show measurements taken by passing a 50 MHz high-frequency current between the two terminal portions 33 in each of the magnetic sensor 1 of the present embodiment and the conventional magnetic sensor.

For the magnetic sensor 1 of the present embodiment and the conventional magnetic sensor, the sensitive portion 30 and the protruding portion 40 were shaped similarly to what is discussed in FIG. 6 in connection with the relationship between the impedance Z and the magnetic field H.

For the magnetic sensor 1 of the present embodiment, a ferrite with a longitudinal length L3 of 18 mm, a transverse width W3 of 10 mm, and a thickness D1 of 2 mm, and a permalloy with a longitudinal length L3 of 10 mm, a transverse width W3 of 6 mm, and a thickness D1 of 0.5 mm were used as the first and second guiding members 51, 52 of the guiding portion 50. The ferrite used was a MnZn ferrite with an initial magnetic permeability of 2500 and a saturation magnetic flux density Bs of 420 mT. The permalloy used was one containing 78% Ni, with an initial magnetic permeability of 60,000 and a saturation magnetic flux density Bs of 720 mT.

For each of the magnetic sensor 1 using the ferrite as the guiding portion 50 and the magnetic sensor 1 using the permalloy as the guiding portion 50, the length X1 of overlap between the guiding portion 50 and the protruding portion 40 was varied between 0 mm, 1 mm, 2 mm, and 3 mm. Note that in the magnetic sensor 1 with the length X1 of overlap of 0 mm between the guiding portion 50 and the protruding portion 40, the first and second guiding members 51, 52 were disposed longitudinally adjacent to the protruding portion 40 of the sensor portion 20, as in the variation shown in FIG. 4. In the magnetic sensor 1 with the length X1 of overlap of 3 mm between the guiding portion 50 and the protruding portion 40, the guiding portion 50 overlapped the entire protruding portion 40. In each of the examples, the guiding portion 50 was not disposed over the sensitive portion 30.

As shown in FIG. 7, the magnetic sensor 1 of the present embodiment including the guiding portion 50 has a lower anisotropic magnetic field Hk than the conventional magnetic sensor without the guiding portion 50, in both cases using the ferrite and the permalloy as the first and second guiding members 51, 52.

Comparing the magnetic sensors 1 including the guiding portion 50, the anisotropic magnetic field Hk decreases as the length X1 of overlap between the guiding portion 50 and the protruding portion 40 increases, in both cases using the ferrite and the permalloy as the first and second guiding members 51, 52.

Also, as shown in FIG. 8, the magnetic sensor 1 of the present embodiment including the guiding portion 50 has an improved sensitivity Smax compared to the conventional magnetic sensor without the guiding portion, in both cases using the ferrite and the permalloy as the first and second guiding members 51, 52.

Comparing the magnetic sensors 1 including the guiding portion 50, those with the length X1 of overlap of 1 mm or 2 mm between the guiding portion 50 and the protruding portion 40 have an improved sensitivity Smax compared to those with the length X1 of overlap of 0 mm or 3 mm, in both cases using the ferrite and the permalloy as the first and second guiding members 51, 52.

From the above, it was confirmed that the sensitivity Smax of the magnetic sensor 1 further improves when the length X1 of overlap between the guiding portion 50 and the protruding portion 40 is from 30% to 70% of the length L2 of the protruding portion 40.

While the exemplary embodiment of the present embodiment has been described above, the present invention is not limited to the above embodiment, and various modifications may be made without departing from the spirit of the invention.

In the magnetic sensor 1 described above, the first and second guiding members 51, 52 have the same shape (length L3, width W3, thickness D1) and the same length X1 of overlap with the protruding portion 40, and are made of the same material. However, these aspects may differ between the first and second guiding members 51, 52. The shape of the first and second guiding members 51, 52 is not limited to the rectangular planar shape but may be varied.

In the magnetic sensor 1 described above, the guiding portion 50 includes both of the first guiding member 51 that guides external magnetic field lines and focuses them in the first protruding portions 41 and the second guiding member 52 that guides magnetic field lines having passed through the sensitive elements 31 and the second protruding portions 42 and dissipates them to the outside. However, this configuration is not limiting. The guiding portion 50 may include at least the first guiding member 51 or the second guiding member 52, provided that a predetermined sensitivity can be assured for the magnetic sensor 1. From the viewpoint of further improving the sensitivity of the magnetic sensor 1, it is preferable that the guiding portion 50 include both of the first guiding member 51 and the second guiding member 52.

In the magnetic sensor 1 described above, the protruding portion 40 includes both of the first protruding portions 41 and the second protruding portions 42. However, this configuration is not limiting. The protruding portion 40 may include at least the first protruding portions 41 or the second protruding portions 42, provided that a predetermined sensitivity can be assured for the magnetic sensor 1. For example, when the protruding portion 40 includes only the first protruding portions 41, the guiding portion 50 (first guiding member 51) may be disposed opposite the first protruding portions 41.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art without departing from the scope and spirit of the present invention. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A magnetic sensor comprising:
    at least one sensitive element including a soft magnetic material and having a longitudinal direction and a transverse direction and a uniaxial magnetic anisotropy in a direction intersecting the longitudinal direction, the at least one sensitive element being configured to sense a magnetic field by a magnetic impedance effect;
    at least one protruding portion including a soft magnetic material and protruding in the longitudinal direction from a longitudinal end of the at least one sensitive element; and
    a guiding member disposed opposite the at least one protruding portion and made of a soft magnetic material, the guiding member being configured to guide magnetic field lines toward the at least one protruding portion,
    wherein the guiding member is disposed to overlap the at least one protruding portion or the guiding member is in contact with a longitudinal end of the at least one protruding portion.

2. The magnetic sensor according to claim 1, wherein a longitudinal length of a region of the guiding member that overlaps the at least one protruding portion is from 10% to 100% of a longitudinal length of the at least one protruding portion.

3. The magnetic sensor according to claim 1, wherein the guiding member has a longitudinal end extending beyond the at least one protruding portion in the longitudinal direction.

4. The magnetic sensor according to claim 2, wherein the guiding member has a longitudinal end extending beyond the at least one protruding portion in the longitudinal direction.

5. The magnetic sensor according to claim 1, wherein
    the at least one sensitive element comprises a plurality of sensitive elements arranged in the transverse direction,
    the at least one protruding portion comprises a plurality of protruding portions protruding in the longitudinal direction from longitudinal ends of the respective sensitive elements, and
    the guiding member is disposed opposite the plurality of protruding portions.

6. The magnetic sensor according to claim 1, wherein the guiding member includes a soft magnetic material with a higher magnetic permeability than a soft magnetic material included in the at least one sensitive element.

* * * * *